(12) United States Patent
Dacosta

(10) Patent No.: US 8,374,087 B2
(45) Date of Patent: Feb. 12, 2013

(54) RELIABLE AUDIO-VIDEO TRANSMISSION SYSTEM USING MULTI-MEDIA DIVERSITY

(75) Inventor: Behram Mario Dacosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1055 days.

(21) Appl. No.: 11/203,326

(22) Filed: Aug. 11, 2005

(65) Prior Publication Data

US 2006/0062243 A1 Mar. 23, 2006

Related U.S. Application Data

(63) Continuation-in-part of application No. 10/949,535, filed on Sep. 23, 2004.

(51) Int. Cl.
*H04L 1/00* (2006.01)
(52) U.S. Cl. .................................................. 370/232
(58) Field of Classification Search ................... 370/232
See application file for complete search history.

(56) References Cited

U.S. PATENT DOCUMENTS

| | | | |
|---|---|---|---|
| 6,078,800 A * | 6/2000 | Kasser | 455/303 |
| 6,272,145 B1 | 8/2001 | Malkin | |
| 6,724,727 B2 | 4/2004 | Counterman | |
| 6,909,741 B1 | 6/2005 | Smith et al. | |
| 6,934,258 B1 | 8/2005 | Smith et al. | |
| 7,065,148 B2 | 6/2006 | Seshardi et al. | |
| 7,230,921 B2 | 6/2007 | Eriksson et al. | |
| 7,492,749 B2 | 2/2009 | Song et al. | |
| 7,710,869 B1 * | 5/2010 | Gleichauf et al. | 370/229 |
| 7,769,021 B1 | 8/2010 | Chen et al. | |
| 8,081,649 B2 * | 12/2011 | Cregg et al. | 370/432 |
| 2001/0028686 A1 * | 10/2001 | Richards | 375/289 |
| 2002/0081096 A1 | 6/2002 | Watanabe et al. | |
| 2003/0062990 A1 | 4/2003 | Schaeffer, Jr. et al. | |
| 2003/0074443 A1 | 4/2003 | Melaku et al. | |
| 2003/0103465 A1 * | 6/2003 | Counterman | 370/252 |
| 2003/0142631 A1 * | 7/2003 | Silvester | 370/252 |
| 2003/0156543 A1 | 8/2003 | Sahinoglu et al. | |
| 2003/0219253 A1 * | 11/2003 | Kukshya et al. | 398/118 |
| 2004/0022179 A1 | 2/2004 | Giannakis et al. | |
| 2004/0024580 A1 | 2/2004 | Salmonsen et al. | |
| 2004/0049797 A1 | 3/2004 | Salmonsen | |
| 2004/0054689 A1 | 3/2004 | Salmonsen et al. | |
| 2004/0062198 A1 | 4/2004 | Pedersen et al. | |
| 2004/0101274 A1 * | 5/2004 | Foisy et al. | 386/46 |
| 2005/0044221 A1 | 2/2005 | Venkatanarayan et al. | |
| 2005/0063355 A1 * | 3/2005 | Iwamura | 370/351 |
| 2006/0025148 A1 | 2/2006 | Karaoguz et al. | |
| 2006/0056448 A1 | 3/2006 | Zaki et al. | |

(Continued)

FOREIGN PATENT DOCUMENTS

WO WO 2004/079997 * 9/2004

*Primary Examiner* — Mark Rinehart
*Assistant Examiner* — Christopher R Crompton
(74) *Attorney, Agent, or Firm* — John P. O'Banion

(57) ABSTRACT

A system and method for switching data packet traffic distribution across diverse transmission medium according to detected quality of service characteristics for a given data packet rate from server to client. It should be recognized that diverse medium are not interdependent with regard to fading or signal strength considerations. Two general modes of switching are described, switching all the data packets, and switching according to a media-time coding mechanism. In one embodiment the data is encoded using Fountain encoding prior to transmission. The data packet transmissions preferably comprise audio-video data packet streams, such as MPEG-2 streams. By way of example, the diverse transmission medium may comprise a wireless connection (i.e., WiFi) used in combination with a power-line network connection, such as within a home network.

20 Claims, 3 Drawing Sheets

U.S. PATENT DOCUMENTS

| | | |
|---|---|---|
| 2006/0062242 A1 | 3/2006 | Dacosta |
| 2006/0126590 A1 | 6/2006 | Putcha et al. |
| 2006/0251026 A1* | 11/2006 | Kalhan .................. 370/335 |
| 2006/0253544 A1* | 11/2006 | Luoma et al. ............ 709/217 |
| 2008/0037541 A1 | 2/2008 | Souissi et al. |
| 2009/0144601 A1* | 6/2009 | Luby et al. ................ 714/774 |
| 2009/0276811 A1* | 11/2009 | Ramaswamy ............ 725/73 |
| 2009/0307565 A1* | 12/2009 | Luby et al. ................ 714/780 |

\* cited by examiner

RELIABLE AUDIO-VIDEO TRANSMISSION SYSTEM USING MULTI-MEDIA DIVERSITY

CROSS-REFERENCE TO RELATED APPLICATIONS

This application is a continuation-in-part of copending application Ser. No. 10/949,535 filed on Sep. 23, 2004, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to network communication systems, and more particularly to home networking of streaming audio-video content.

2. Description of Related Art

It is of ever-increasing importance to provide reliable mechanisms for streaming video and/or audio content over a network, such as from a server to a client. Often, however, signal interference or degradation in the transmission medium limits this ability, wherein the network is either unusable or has a lower quality of service or bandwidth than desired. Numerous applications exist for communicating streaming data between devices on a network.

By way of example, home networking devices can be configured for communicating audio-video streams, such as between home video servers streaming movies to non-intelligent ("dumb") terminals within the same home environment. It will be appreciated that applications such as streaming media in the home environment have stringent quality of service (QoS) requirements. For example, for a given packet data rate, the packet error rate (PER) and bit error rate (BER) must be kept sufficiently low wherein the incidence of dropped packets is minimized so that it does not noticeably detract from picture quality for a given packet data rate. In addition, jitter and latency must be minimized to maintain desired picture quality and for additional reasons (i.e., to provide acceptable performance when transmitting packets for video-conferencing and teleconferencing.)

The use of "portable" connectivity solutions, such as wireless (e.g., WiFi™, Bluetooth™, and the like) and power-line connectivity (i.e., HomePlug™), are increasing in popularity as they do not require the installation of dedicated wiring (i.e., Ethernet cabling) or other infrastructure. However, unlike dedicated wiring, these links are subject to various forms of interference.

Previously, maintaining quality of service on these links has been attempted on an individual channel-by-channel basis. For example, in attempting to compensate for dynamically changing network capacity, the transmission rate for a WiFi link is decreased when the transmission PER increases. Maximum ratio combining and multiple input multiple output (MIMO) techniques are also utilized within WiFi networks. In addition, some wireless systems utilize additional techniques, such as switching techniques wherein if a transmitter is unable to perform packet transmissions on a first antenna it switches to a second antenna on the receiver. However, these systems do not always provide an acceptable quality of service increase for a given data packet rate.

It will be appreciated, therefore, that a need exists for a system and method of maintaining high levels of quality of service despite variations in signal conditions. The present invention fulfills that need, as well as others, and overcomes drawbacks inherent with previous solutions.

BRIEF SUMMARY OF THE INVENTION

A system and method are described for increasing the quality of service (QoS) of network connections. It has not been fully appreciated within the industry that the use of multiple antennas, or even multiple transmission paths having similar characteristics, are not sufficient for significantly increasing minimum quality of service levels or minimum usable data packet bandwidth. The inability to assure increased minimum values of QoS arises in response to the transmission paths often being subject to the same forms of interference, wherein conditions which affect one path also affect the other transmission paths.

In contrast to this the present systems and methods make use of multiple diverse transmission medium for connecting electrical devices. The diverse medium utilized according to the present invention have substantially different characteristics, wherein transmission over the diverse medium is not subject to dependencies with regard to fading or signal strength considerations. In contrast, the use of multiple similar wireless channels (e.g., same medium, similar frequency range, encoding and so forth) are all similarly effected in response to RF disturbances.

The present invention couples network nodes with at least two diverse medium and describes methods for controlling the diverse medium. The streaming data is passed over diverse medium, such as over a combination of wireless transmission and power-line transmission.

The client and server in these networks are typically within a short radio-range of one another, for example within a home networking environment. The home based network in a preferred example of the invention is configured for communicating audio-video streaming packet data between audio-video capture devices, audio-video player devices and audio-video output devices, all coupled to a home network within which the devices are configured for communicating according to the invention across diverse medium.

By way of example, a preferred embodiment of the present invention utilizes a diverse medium home network comprising a wireless network in combination with a power-line network. The wireless network connection can comprise any convenient type of wireless communication, such as WiFi™, or Bluetooth™, and so forth. For the sake of clarity, examples herein describe the use of WiFi connections, which are more accurately described as a set of wireless network standards such as within the group of IEEE 802.11 standards (e.g., 802.11a, 802.11b, 802.11g, and similar standards), or other wireless networking standard, as will be typified herein. Any form of power-line network standard can be adapted for use in combination with the wireless network, such as Home-Plug™. It will be readily apparent that a wireless network and a wired power-line network will be subject to substantially different forms of interference.

Controlling packet data transmissions over the diverse medium within the present invention is described as diversifying the distribution of packet data traffic over the diverse medium in response to quality of service (QoS) for a given data packet rate. For example switching mechanisms are described which fully switch the packet streams from one medium to another, or that switch the distribution of packet stream transmission according to what is here proposed as media-time coding methods. Such media-time encoding methods are similar to space-time coding methods; however while space-time encoding methods are used exclusively across multiple spatial channels in one wireless channel, media-time encoding is used across multiple different media. It should be appreciated, however, that other switching mechanisms can be alternatively utilized for altering the dissemination of packet traffic over the diverse medium without departing from the present invention.

A full switching mechanism selects a diverse channel in response to quality of service degradation which is detected in response to low bandwidth availability or high error rates (i.e., in response to ACKs from the client) arising on the currently selected medium, such as a default medium. The technique is preferably configured for returning to test the default form of diverse medium, such as periodically, to determine if use can be resumed.

The other preferred mechanism relies on media-time coding mechanisms wherein data is transmitted simultaneously on more than one of the diverse mediums according to media-time coding techniques therein increasing the quality of service for the overall connection. Media-time encoding may be generally considered as a type of Forward Error Correction (FEC). The diverse media utilized according to the invention provide substantially different transmission characteristics, examples of which may be 802.11a with Power Line; 802.11x with UWB (Ultra-Wide Band); 60 GHz with UWB (Ultra-Wide Band), 802.11a with 802.11g, and so forth.

In one embodiment of the invention, Fountain Codes are utilized within transmissions segmented into time divisions. The Fountain encoded data is transmitted simultaneously over the two or more transmission media. The independent nature of the Fountain code transmissions is directed toward reducing the retransmission burden on the transmitter.

An embodiment of the invention may be described as an apparatus for providing increased transmission quality of service, comprising: (a) a server having multiple forms of transmission medium configured for communicating packet data to a client; (b) means of detecting transmission quality of service changes; and (c) means for transmitting packet data on the multiple forms of transmission medium and diversifying the packet data in response to changes in the detected quality of service. The diversification of packet data can comprise either switching the entire data packet stream to a particular medium that provides sufficient quality of service at a given bandwidth, or changing the media-time coding performed when transmitted the packet data simultaneously over the diverse medium.

An embodiment of the invention may also be described as an apparatus for providing increased data packet transmission quality of service, comprising: (a) a server having multiple diverse forms of transmission medium configured for communicating packet data to a client; (b) a computer processor configured for controlling data packet transmissions over the diverse forms of medium; and (c) programming configured for execution by the computer processor for, (c)(i) detecting changes in the quality of service (QoS), (c)(ii) diversifying packet data transmission between the diverse medium in response to changes in the quality of service (e.g., ACK traffic, usable packet bandwidth, or error rates). Media-time coding modes preferably comprise encoding data packets utilizing space-time trellis coding (equivalent to space-time trellis coding, except that the dimension of space is replaced by the dimension of media), block coding, or interleaving. The packet data transmissions preferably comprise forms of streaming data including video, audio, or a combination, such as MPEG-2 data streams being but one example.

An embodiment of the invention may also be described as a method of increasing quality of service for packet based transmissions, comprising the steps of: (a) coupling diverse medium between a client and server; (b) configuring the client and server for communication of data packets over the diverse medium; (c) detecting the quality of service of the communication of data packets for a given data packet rate; and (d) switching distribution of data packet transmissions across diverse medium in response to detected quality of service for the given data packet rate.

It should be appreciated that the present invention provides a number of beneficial aspects including but not limited to the following.

An aspect of the invention is to provide increased reliability and quality of service for networks, for example those including a wireless networking connection.

Another aspect of the invention is to provide complementary use of diverse medium which are not subject to the same interference sources, wherein minimum quality of service can be substantially increased.

Another aspect of the invention is to provide increased quality of service by complementing a wireless medium connection with a diverse connection such as a power-line connection, or another wireless medium of different characteristics, which is not subject to the same interference sources as the wireless connection.

Another aspect of the invention is to provide a means for reducing network interference which may be utilized for communicating data streams, such as audio-video streams.

Another aspect of the invention is to provide a means for communicating packet data between client and server devices, such as connected within a home (or business) networking environment.

Another aspect of the invention is to provide a transmission medium switching control method for selecting one of the diverse medium for communication so that quality of service for the connection is maintained despite interference on either of the separate medium.

Another aspect of the invention is to provide a simultaneous transmission control method for utilizing the diverse medium according to media-time coding, so that quality of service for the connection is maintained despite interference on either of the separate medium.

Another aspect of the invention is to provide a method of improving quality of service which may be readily implemented.

Another aspect of the invention is to provide a method of improving quality of service without the need to provide dedicated wired connectivity or complicated forms of wireless connectivity.

Another aspect of the invention is to take advantage of Fountain codes within the multi-media diversity system.

A still further aspect of the invention is to provide a method of improving reliability which can fully make use of the diversity benefits associated with the medium connected across the network.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
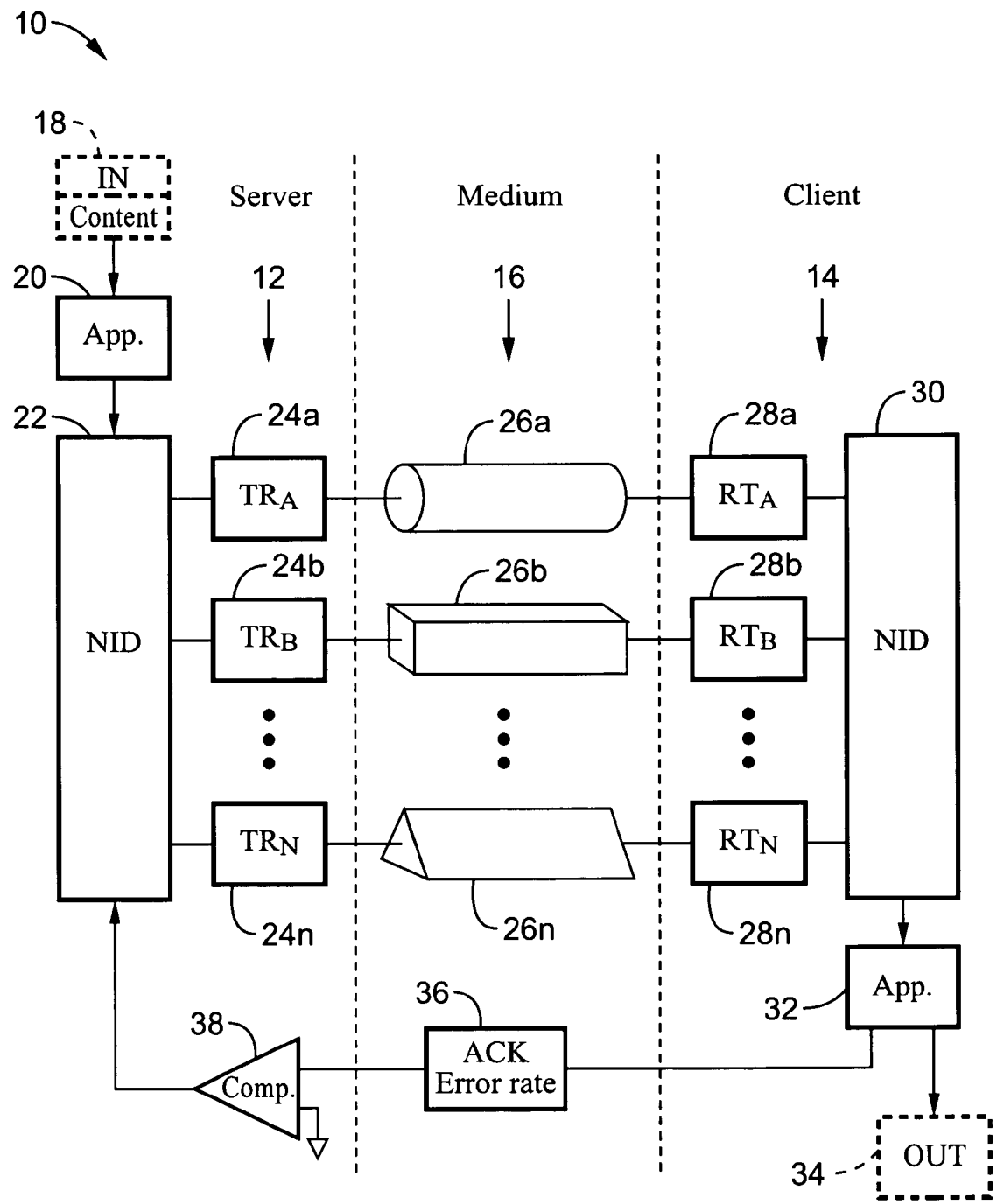
FIG. 1 is a block diagram of diverse communication medium connecting a server to a client according to an embodiment of the present invention.
Figure 2:
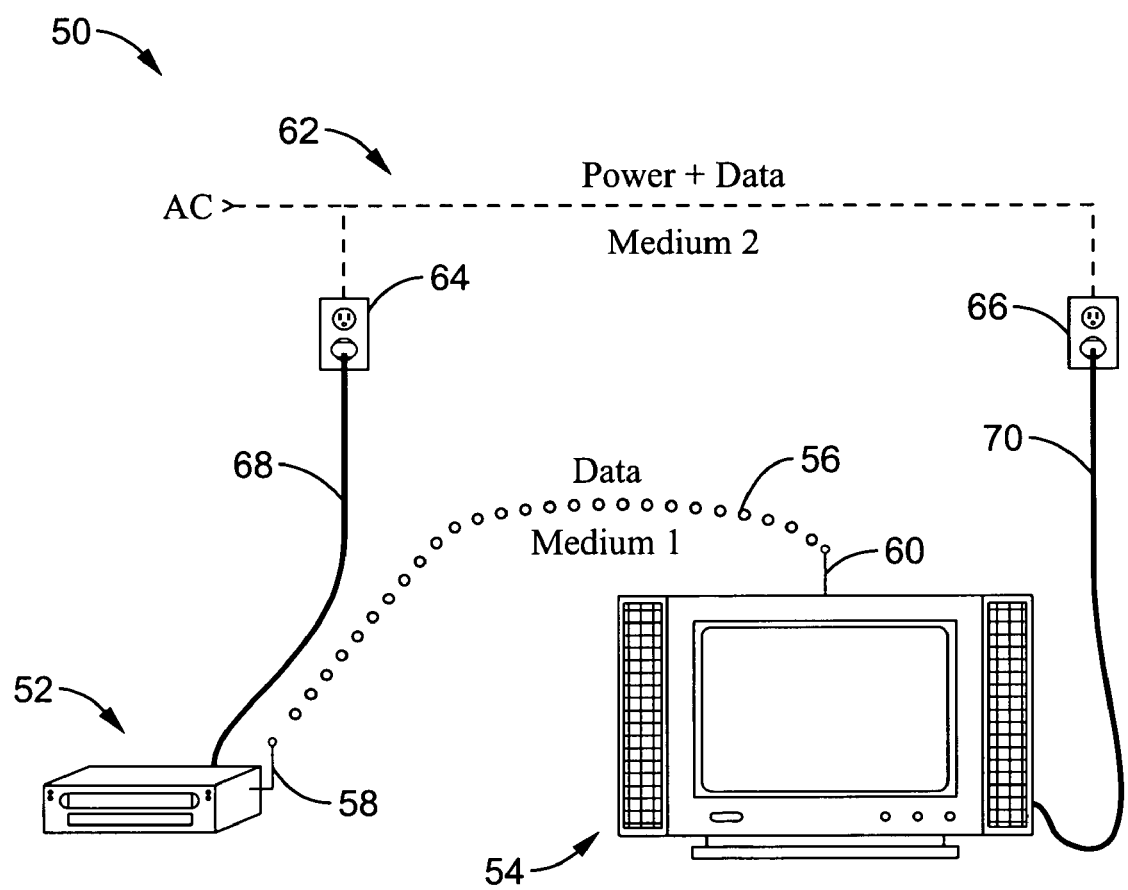
FIG. 2 is a block diagram of diverse medium comprising a WiFi connection with a power-line connection, the combination being utilized in combination according to an aspect of the present invention.
Figure 3:
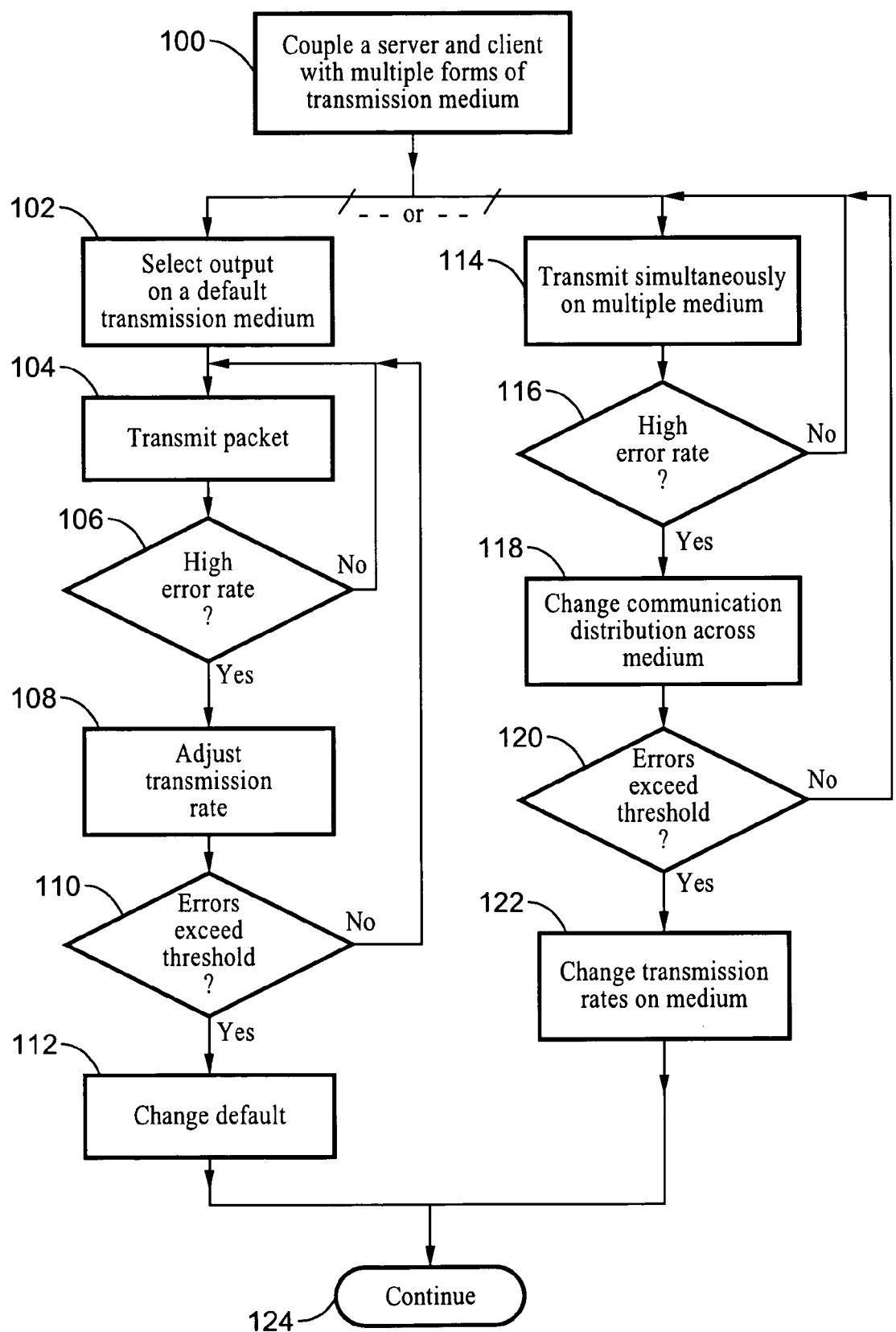
FIG. 3 is a flowchart of controlling diverse medium operations according to an aspect of the present invention, showing processing associated with full switching and simultaneous use modes.

Referring more specifically to the drawings, for illustrative purposes the present invention is embodied in the apparatus generally shown in FIG. 1 through FIG. 3. It will be appreciated that the apparatus may vary as to configuration and as to details of the parts, and that the method may vary as to the specific steps and sequence, without departing from the basic concepts as disclosed herein.

FIG. 1 illustrates an embodiment 10 of a system which utilizes multi-medium diversity transmissions according to the present invention. The embodiment depicts an example of communication between a server 12 and a client 14 through diverse medium 16. The multiple diverse medium comprises medium in which fading or signal strength vary independently on at least two of the transmission paths (medium). The diversity of the medium is represented in the figure by way of channel symbols having distinct (diverse) cross-sections. The diverse medium can compose two diverse channels of communication, but may also comprise any number of channels, at least two of which are diverse according to the above definition. Typically, audio-video data packets are being communicated from a server to a client, although information may also be communicated back from the client to the server. It should also be appreciated that at least in some applications the roles of client and server can reverse depending on the operating mode between network devices.

An incoming packet stream or a content source 18 is received by application 20, such as a server application. A network interface driver 22 on this server side is configured for selecting how the data stream is to be switched/diversified between the diverse medium 16 in response to detected quality of service (QoS). Embodiments of the invention describe two principle types of switching/diversification which can be performed, full switching between the diverse mediums and partial switching, such as in which simultaneous transmissions occur according to media-time coding methods across more than one of the diverse medium simultaneously. Transceivers 24a, 24b and 24n are coupled for transmission and reception through diverse medium 26a, 26b, 26n with client transceivers 28a, 28b and 28n. It should be noted that the "shape" of the channel symbols 26a, 26b, 26n (round, square and triangular) bear on the present invention as a way of indicating that the associated medium are characteristically diverse from one another. The network interface 30 on the client side utilizes the data streams as sent for providing data to client application 32, which for example may output audio-video data to a television (or video monitor having audio capability) 34.

Decisions are made by the server network interface driver 22 as to how to switch/diversify the traffic across the diverse medium and how to establish data rates over the diverse medium based on quality of service considerations. By way of example and not limitation, the quality of service considerations can be determined by detecting usable bandwidth, acknowledgement information and/or error rate information. The detection of quality of service is represented in this functional block diagram as block 36 providing feedback from the client that is compared against a threshold level, as represented by comparator 38. It should be appreciated that the analog block representations are provided to describe aspects of functionality, although thresholding is more preferably carried out by executing programming that provides the functionality of network interface 22.

FIG. 2 illustrates an example embodiment 50 showing a server depicted as audio-video source device 52 which is communicating an audio-video stream to a playback device 54, depicted as a video monitor with audio capabilities 54. A first medium 56 is depicted as a wireless connection (e.g., WiFi™, Bluetooth™, or other wireless digital communication standard) between antenna 58 and antenna 60 (although typically hidden, these antennas are shown for consonance with the description). A diverse second medium 62 is depicted as power-line communication between outlet 64 and outlet 66, to which power cords 68, 70 are attached from the respective devices. The power supplies in both the client and server are configured for super-imposing and/or extracting communication signaling from the power line. It should be appreciated that the power-line medium and wireless radio-frequency (RF) transmission medium clearly have different characteristics so that fading and signal strength on these medium vary independently, unlike for example the use of two RF communication channels having similar frequency and transmission characteristics.

FIG. 3 illustrates by way of example the processing of signals within a client-server embodiment. The server and client are coupled to one another using diverse medium (multiple medium) as represented by block 100. By way of example, two forms of signal switching processing are outlined herein as a full-switching form and a FEC media-time diversity form. It will be appreciated that both the client and server must provide compatible forms, which can be exclusively or selectively utilized from any number of forms available at the client and/or server.

According to a full switching form a default transmission medium is selected as represented by block 102 and a packet, or packet string, is transmitted as per block 104. If the error rate, as detected by block 106, is within limits then transmission continues. If the error rate is beyond a first limit then block 108 is executed and the transmission rate as per block 108 is adjusted. If the errors exceed a second threshold or cannot be corrected by the change in transmission rate, as detected by block 110, then the default form of transmission is changed at block 112 and transmissions continue at block 124 which can proceed to transmit additional packets, such as per block 104. In this way the medium is selected for transmission which can best provide the necessary bandwidth with a sufficiently low error rate. The altering of the transmission rate within the medium is optional and prevents undue switching between medium in response to small transmission channel disturbances. A number of variations can be implemented according to these teachings which utilize different mechanisms for determining medium selection without departing from the teachings of the present invention.

According to a form that may be viewed as a type of partial switching, in which some simultaneous transmissions can be generated across both the media simultaneously, packets are transmitted as per block 114, such as according to a default packet distribution or media-time coding. If error rates do not exceed an error threshold, as detected by block 116, then transmission continues. If excessive errors arise, then the distribution or media-time coding of packets between the diverse medium is altered as per block 118. If sufficient errors arise as detected by block 120, then the transmission rates utilized by one or more of the mediums is changed to reduce error rates, as depicted by block 122. The process continues as per block 124 and additional packets, or packet streams, are sent between server and client.

It should be appreciated that packets may be distributed across the multiple diverse mediums, and that if sufficient bandwidth exists on these medium, then any desired level of redundant transmission may be performed.

In both transmission mechanisms the quality of service of packet transmission is detected and used to modulate switching. The quality of service is preferably registered in response to bandwidth availability, acknowledgements from client, or error rates. It will be appreciated that the means for detecting quality of service can comprise any one of these mechanisms, similar mechanisms, or a combination of detection mechanisms. It should also be appreciated that packets in the stream are being buffered, wherein the changes to the transmission rates being utilized by the system and their distribution across the medium are preferably performed based on an average bandwidth over a given period of time, thus preventing short interference perturbations to trigger unwarranted changes in packet transmission rate or distribution across the diverse medium.

The following example considers one possible implementation of a full switching form of the invention in which a 20 mbps audio-video stream is communicated between the server device 52 of FIG. 2 to the client device 54. The server selects a preferred default transmission medium, which can be considered a modality for transmitting the data, for example selecting the power-line medium. The server may attempt to transmit data packets using a selected modulation scheme (i.e., 64 QAM) to accommodate the 20 mbps data rate along with any associated overhead. It should be appreciated that the transmission schemes utilized for the different modalities are typically according to different communication protocols. Optionally, a lower communication data rate may be utilized if the source rate can be controlled, such as changing resolution, encoding, or other mechanism which alters the streaming rate. In either situation the initial data rate selected is preferably a stable data rate for the system.

If the network interface driver on the server attempts to transmit packets to the server, and transmission fails for any packet or group of packets depending on granularity, then transmission is reattempted for a total of ThreshRetry(Powerline) attempts. If the total number of retries exceeds ThreshRetry(Powerline) then the network interface drive attempts to transmit the packet to the client at a suitable modulation through the WiFi medium to accommodate the 20 mbps rate.

However, if the server is unsuccessful at any time, transmissions will be retried until ThreshRetry(WiFi) at which time an attempt is then made over the power-line interface. If at any time, the total number of transmission attempts for any packet exceeds ThreshRetry(Modulation) then the original interface (i.e., power-line) on which the packet initially failed is utilized once again, but on this attempt the modulation and/or error coding overhead is decreased, such as changing the modulation technique to 16 QAM. When the change is made the retry counters are initialized, such as to zero, and the transmission procedure is retried as was the case for the modulation to 64 QAM. Optionally, the system can provide for periodically determining if conditions have changed to allow use of alternative (i.e., higher rate) modulation techniques (i.e., 64 QAM).

It should be appreciated that ThreshRetry(Powerline) and ThreshRetry(WiFi) can be changed dynamically depending on the particular application and conditions. For example, if transmission attempts on the power-line network tend to always fail, then the ThreshRetry(Powerline) can be reduced to a value of one, and may be set so that it is rarely attempted (i.e., a maximum of once per second). This technique reduces the latency which would otherwise arise from attempting to retransmit packets on an interface that is not active (i.e., power-line connection not established), or is only marginally active.

If the number of consecutive successful transmissions on an interface (i.e., WiFi interface) exceeds ThreshRetry(WiFi), then a rate adaptation protocol within the present invention can attempt to transmit utilizing the next higher rate of modulation, in particular if the system can utilize the added bandwidth to increase stream quality, or for communicating another stream which is sharing the bandwidth.

The following considers an alternative to the full switching methodology above and provides a mechanism in which simultaneous transmissions are performed across the diverse medium. This mechanism is preferably performed according to a media-time coding methodology, a concept to be defined below. By way of example this scenario also considers a 20 mbps audio-video stream being communicated between the server device of FIG. 2 and the client device. In this specific example the diverse media, or portions thereof, are utilized simultaneously using media-time coding techniques (i.e., space time trellis codes) and interleaving. In this instance each medium is considered somewhat analogous to different spatial channels in a traditional wireless media-time coding scheme.

It will be appreciated that conventional space-time coding seeks to simultaneously exploit spatial and temporal diversity by spreading symbols across time and multiple transmit antennas before transmission. The two primary approaches, space-time trellis coding and space-time block coding represent methods of transmitter-based signal processing for diversity exploitation and interference suppression. Space-time trellis codes perform well, yet at the expense of high complexity. Space-time block codes, on the other hand provide simple (linear) maximum-likelihood decoding.

In the proposed media-time encoding, the dimension of space in space-time encoding is replaced by the dimension of transmission media type. This "media-time" encoding may be best understood by considering an example. Consider one of the most simple implementations of media-time encoding as proposed here, using the following example: At the Server (transmitter) MPEG packets of the video stream may be interleaved and encoded using Reed-Solomon (RS) block encoding. Every alternate RS encoded packet is transmitted to the client (receiver) via a different medium. Hence the encoding is across different media, and across time (via interleaving and the RS encoding), and hence is called "media-time encoding". If the present invention were not used, every encoded packet would be transmitted over the same medium, and transmission errors (which tend to be bursty) would destroy both the original MPEG data as well as the FEC data needed to correct transmission errors. However, by using media-time encoding, different segments of video-data and correction-information are distributed across media with substantially uncorrelated transmission losses, hence increasing the proportion of transmission errors that can be corrected at the receiver, and also maintaining low latency. This example with RS encoding is used to explain the underlying concept of the invention, though it should be understood that the techniques of media-time encoding can be implemented using substantially more sophisticated FEC methods as well.

Less preferred variations to the proposed techniques can increase throughput by other forms of simultaneous use of the diverse medium thus improving overall throughput. Each data transmission may, for example, be simultaneously transmitted on multiple links, with coding and transmission on each link being independent of coding and transmission across the other links. These however, are not considered the most preferred approaches within the present invention.

In the preferred media-time approach each type of available medium increases the order of diversity. In effect the second link is used to compensate for any temporary fading or outage detected in the first link. This is true of both the switching and media-time approach detailed within the present invention. Since the probability of both types of links failing simultaneously (fade correlation) is very low, a diversity advantage is provided by the present system allowing the stream to be carried reliably across multiple (i.e., two or more) diverse medium.

It should be appreciated that conventional techniques may be utilized within either the full switching or media-time approach when it is necessary to decrease the modulation/encoding rate. Bandwidth feedback for example can be utilized to vary the rate at which data is being produced. Other methods of FEC (such as Trellis encoding at the PHY layer as used in 802.11a/b/g for example) for transmissions on any single medium are not precluded by what is presented here. In addition, decisions regarding the use of diverse medium can be enhanced by detecting the error rates of the medium, signal to interference and noise ratio (SINR), and so forth.

In one embodiment of the invention Fountain codes are utilized toward providing additional benefits, such as reducing retransmission overhead. The data to be transmitted is encoded using a class of codes referred to as Fountain Codes. An important property of digital Fountain encoding is that the source data transmitted can be reconstructed intact from any subset of the received encoded packets approximately equal in total size to the source data. Several types of Fountain erasure codes exist, including Tornado codes, which are practical for real-time applications having limited computational resources.

For m input binary vectors, a Fountain code can produce almost any number of independent output binary vectors such that the original m input binary vectors can be regenerated from a number of output vectors, the number of output vectors being few more in number than the m input binary vectors in the lossless transcase, and more in number in the lossy case. The total number of output vectors is dependent on the rate of transmission loss.

Consequently, the audio-video data at the transmitter is segmented into time intervals over which data is encoded using a Fountain encoding scheme. The Fountain encoded data is then transmitted simultaneously over two or more transmission media. The receiver is configured to receive the Fountain encoded data over each of the mediums being utilized only until it has completely regenerated the original data for that time interval, after which it may either signal the transmitter to transmit the next time interval of data, or alternately it may ignore further data until transmission of the next time interval.

In being configured to receive encoded data across two mediums, the receiver hence increases its ability to successfully regenerate the original data without requesting retransmissions. In the same manner, the receiver reliability may be increased further by choosing to receive data across a third, or additional medium, without the corresponding transmitter(s) being aware of the level of redundancy and reliability chosen by different receivers.

By utilizing the independent nature of packets of Fountain encoded data, the receiver is freed from having to request retransmission of specific packets from the transmitter, and without the necessity of the transmitter having to finely synchronize with original packets being sent over each medium. It should be appreciated that the Fountain encoded method described herein also allows separate spatially distributed transmitters to transmit Fountain encoded data to the receiver.

The present invention provides a system and method whereby the quality of service between network elements can be configured for communicating over diverse medium. Embodiments are described which provide examples of aspects of the invention, however, the teachings may be adapted in numerous ways which will be known to one of ordinary skill in the art without departing from the present invention.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for providing increased transmission quality of service, comprising:

a server configured for simultaneously transmitting packet data through different transmitters, co-located with said server, over parallel diverse transmission medium along an entire path to a client having different receivers co-located with said client;

wherein said diverse medium are subject to different forms of interference;

means of detecting quality of service of said transmission;

means for Fountain encoding packet data using media-time coding and interleaving across said parallel diverse transmission medium; and means for transmitting Fountain encoded packet data across said diverse transmission medium and distributing said packet data, which is interleaved and media-time coded with alternate packets transmitted, across said diverse medium in response to changes in the detected quality of service;

wherein said multiple diverse transmission medium comprise both a wireless connection and a power-line connection;

wherein said Fountain encoded data is transmitted simultaneously over said wireless connection and said power-line connection;

wherein said diverse medium comprise medium in which fading or signal strength vary independently when comparing at least two of the diverse medium; and wherein said diverse medium comprise wireless medium, at least two of which provide different propagation characteristics.

2. An apparatus as recited in claim 1, wherein the diversity of transmission medium provides compensation by a second or subsequent medium for any temporary fading or outage experienced in a first medium over which data is transmitted to said client.

3. An apparatus as recited in claim 1, wherein said means for transmitting is configured for segmenting the data into time intervals over which data is encoded using a Fountain encoding scheme.

4. An apparatus as recited in claim 1, wherein upon being received the Fountain encoded data can be reconstructed intact from any subset of the encoded packets which is approximately equal in total size to the data which was transmitted.

5. An apparatus as recited in claim 1, wherein said packet data comprises forms of streaming data including video, audio, or a combination.

6. An apparatus for providing increased data packet transmission quality of service, comprising:

a server coupled to different transmitters, co-located with said server, having multiple diverse forms of transmission medium configured in parallel for simultaneously communicating data along an entire path to a client having different receivers;

wherein said diverse medium comprises both a wireless connection and a power-line connection which are subject to different forms of interference;

a computer processor configured for controlling data packet transmissions over said diverse forms of medium; and programming configured for execution by said computer processor for, detecting changes in the quality of service (QoS), segmenting data into time intervals over which data is encoded using a Fountain encoding scheme with media-time coding and interleaving across said parallel diverse transmission medium, and distributing Fountain encoded packet data transmission, which is interleaved and media-time coded with alternate packets transmitted across said diverse medium in response to said changes in quality of service;

wherein said Fountain encoded data is transmitted simultaneously over both said wireless connection and said power-line connection;

wherein said diverse forms of transmission medium comprise medium in which fading or signal strength vary independently when comparing at least two of the diverse transmission medium; and wherein said diverse forms of transmission medium comprise wireless medium, at least two of which provide different propagation characteristics.

7. An apparatus as recited in claim 6, wherein the diversity of transmission medium provides compensation by a second or subsequent medium for any temporary fading or outage experienced in a first medium over which data is transmitted to said client.

8. An apparatus as recited in claim 6, further comprising automatically increasing the transmission rate of packet data to utilize higher available bandwidths, or decreasing the packet data transmission rate to reduce error rates in response to lower available data bandwidth.

9. An apparatus as recited in claim 6, wherein said packet data comprises forms of streaming data including video, audio, or a combination.

10. An apparatus as recited in claim 6, wherein said diverse forms of transmission medium comprise medium in which fading or signal strength vary independently when comparing at least two of the diverse transmission medium.

11. An apparatus as recited in claim 6:

wherein said diverse forms of transmission medium comprise medium in which fading or signal strength vary independently when comparing at least two of the diverse transmission medium; and wherein said diverse forms of transmission medium comprise at least one wireless medium utilized with at least one power-line medium.

12. An apparatus as recited in claim 6:

wherein said server comprises a network server; and wherein said network server is configured for communicating within a home based network.

13. An apparatus as recited in claim 6:

wherein said server comprises a network server;

wherein said network server is configured for communicating within a home based network; and wherein said home based network is configured for communicating audio-video packet data between audio-video capture devices, audio-video player devices and audio-video output devices.

14. An apparatus as recited in claim 6, wherein upon being received the Fountain encoded data can be reconstructed intact from any subset of the encoded packets which is approximately equal in total size to the data which was transmitted.

15. A method of increasing quality of service for packet based transmissions, comprising:

configuring a client and server for simultaneous communication of data packets through different transmitters over diverse forms of parallel transmission medium along an entire path to a client having different receivers;

wherein said different transmitters are collocated with said server;

wherein said different receivers are collocated with said client;

wherein said diverse medium comprise both wireless connection and power-line connection which are subject to different forms of interference;

detecting the quality of service of said communication of data packets for a given data packet rate between the client and server;

segmenting the data into time intervals over which data is encoded using a Fountain encoding scheme with media-time coding and interleaving across said parallel diverse transmission medium; and distributing Fountain encoded data packet transmissions, which are interleaved and media-time coded with alternate packets transmitted across diverse medium in response to detected quality of service for the given data packet rate between the client and server;

wherein said diverse forms of transmission medium comprise medium in which fading or signal strength vary independently when comparing at least two of the diverse transmission medium;

wherein said Fountain encoded data is transmitted simultaneously over both said wireless connection and said power-line connection;

wherein said diverse forms of transmission medium comprise medium in which fading or signal strength vary independently when comparing at least two of the diverse transmission medium; and wherein said diverse forms of transmission medium comprise wireless medium, at least two of which provide different propagation characteristics.

16. A method as recited in claim 15, further comprising reconstructing received Fountain encoded data in response to receipt of any subset of the Fountain encoded packets approximately equal in total size to the data which was transmitted.

17. A method as recited in claim 15, wherein the transmission of data packets across said diverse transmission medium provides compensation by a second or subsequent medium for any temporary fading or outage experienced in a first medium over which data is transmitted to said client.

18. A method as recited in claim 15, wherein the diversity of said diverse medium provides compensation by a second or subsequent medium for any temporary fading or outage experienced in a first medium over which data is transmitted to said client.

19. A method as recited in claim 15, further comprising automatically increasing transmission rate of data packets to utilize higher available bandwidths, or decreasing the transmission rate of data packets to reduce error rates in response to lower available data bandwidth.

20. A method as recited in claim 15, wherein said data packets comprise forms of streaming data including video, audio, or a combination.

* * * * *